(12) United States Patent
White (10) Patent No.: US 10,243,482 B2
(45) Date of Patent: Mar. 26, 2019

(54) SOLID-STATE POWER CONVERTERS

(71) Applicant: Hamilton Sundstrand Corporation, Charlotte, NC (US)

(72) Inventor: Adam M. White, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1130 days.

(21) Appl. No.: 14/330,668

(22) Filed: Jul. 14, 2014

(65) Prior Publication Data
US 2016/0013734 A1 Jan. 14, 2016

(51) Int. Cl.
*H02M 7/757* (2006.01)
*H02M 7/537* (2006.01)
*H02M 7/487* (2007.01)
*H02M 1/00* (2006.01)

(52) U.S. Cl.
CPC .......... *H02M 7/537* (2013.01); *H02M 7/487* (2013.01); *H02M 2001/0048* (2013.01); *Y02B 70/1491* (2013.01)

(58) Field of Classification Search
CPC .................................................. H02M 7/757
USPC ........ 363/131–132, 95–98, 55, 56.01, 56.02, 363/40, 41
See application file for complete search history.

(56) References Cited

U.S. PATENT DOCUMENTS

| | | | | |
|---|---|---|---|---|
| 6,304,460 B1* | 10/2001 | Cuk | ........................ | H02M 1/34 363/131 |
| 6,388,896 B1* | 5/2002 | Cuk | .................... | H02M 3/1582 363/16 |
| 6,400,579 B2* | 6/2002 | Cuk | ........................ | H02M 1/44 323/266 |
| 7,479,774 B2* | 1/2009 | Wai | ........................ | H02J 3/383 323/222 |
| 9,525,348 B1* | 12/2016 | Aeloiza | .................. | H02M 3/158 |
| 2001/0024373 A1* | 9/2001 | Cuk | ........................ | H02M 1/44 363/16 |
| 2007/0236187 A1* | 10/2007 | Wai | ........................ | H02J 3/383 323/222 |

(Continued)

FOREIGN PATENT DOCUMENTS

| | | |
|---|---|---|
| EP | 1443648 A1 | 8/2004 |
| EP | 2590312 A1 | 5/2013 |

OTHER PUBLICATIONS

Extended European Search Report for Application No. 15172836.7-1809 dated Nov. 24, 2015.

(Continued)

*Primary Examiner* — Adolf Berhane
*Assistant Examiner* — Nusrat Quddus
(74) *Attorney, Agent, or Firm* — Locke Lord LLP; Scott D. Wofsy; Christopher J. Cillié

(57) ABSTRACT

A phase leg for a multilevel inverter includes a first direct current lead, an outer solid-state switch, an inner solid-state switch, and a midpoint-clamping device. The outer solid-state switch device is connected to the first direct current lead. The inner solid-state switch is connected in series with the outer solid-state switch. The midpoint-clamping device is a bi-directional current flow device connected between a second DC lead and a node between the inner and outer solid-state switches for reducing conduction losses associated with current flowing through the phase leg.

13 Claims, 5 Drawing Sheets

(56) References Cited

U.S. PATENT DOCUMENTS

2011/0140727 A1* 6/2011 Soldi ............... H03K 17/18
                                                    324/762.01
2012/0031395 A1   2/2012 Plotkin et al.
2013/0154391 A1* 6/2013 Urciuoli ............ H03K 17/081
                                                    307/112

OTHER PUBLICATIONS

Bruckner T et al: "Loss balancing in three-level voltage source inverters applying active NPC switches," 32nd Annual IEEE Power Electronics Specialists Conference. PESC 2001. Conference proceedings. Vancouver, Canada, Jun. 17-21, 2001: New York, NY: US, vol. 2 pp. 1135-1140, XP01055938; DOI:10.1109/PESC.2001. 954272; ISBN:978-0-7803-7067-8; Figure 3, table III p. 1136-p. 1137.

Thiago B Soeiro et al: "Novel 3-level Hybrid neutral-Point-Clamped Converter" IECON2011—37th annual Conferenceon IEEE Industrial Electronics Society, IEEE, Nov. 7, 2011, pp. 4457-4462. X[032105165, DOI: 10.1109/iecon.2011.6120042 ISBN: 978-1-61284-969-0; figure 1(d), p. 1-p. 2.

EPO Official Examiner's Letter dated Sep. 6, 2017, received from the European Patent Office for Application No. 15 172 836.7.

* cited by examiner

| SWITCH | | CONFIGURATION | | | |
|---|---|---|---|---|---|
| | | I<br>102<br>TO<br>114 | II<br>112<br>TO<br>114 | III<br>112<br>TO<br>114 | IV<br>104<br>TO<br>114 |
| | 120 | CLOSED | OPEN | OPEN | OPEN |
| | 130 | CLOSED | CLOSED | CLOSED | OPEN |
| | 140 | OPEN | CLOSED | CLOSED | CLOSED |
| | 150 | OPEN | OPEN | OPEN | CLOSED |
| | 160 | OPEN | CLOSED | CLOSED | OPEN |
| | 170 | OPEN | CLOSED | CLOSED | OPEN |

III

III

US 10,243,482 B2

SOLID-STATE POWER CONVERTERS

BACKGROUND OF THE INVENTION

1. Field of the Invention

The present disclosure relates to power converters, and more particularly to multilevel inverters for converting direct current (DC) voltage into alternating current (AC) voltage.

2. Description of Related Art

Inverters convert DC voltage into AC voltage. Multilevel inverters employ multiple voltage levels and solid-state switch devices. The multiple voltage levels are generally formed by connections to a positive DC terminal, a negative DC terminal and a middle DC terminal having a potential greater than the negative DC terminal and less than the positive DC terminal. A controller cycles the solid-state switch devices between on and off states to generate output AC voltage, generally with a stepped waveform approximating a sinusoidal waveform. The solid-state switch devices are generally either insulated gate bipolar transistors (IGBTs) or field effect transistors (MOSFETs) grouped into one or more phase legs.

Each phase leg generally includes four serially connected solid-state switch devices. The outer of the serially connected devices connect directly to positive and negative DC terminals. The inner of the serially-connected devices are directly connected to one another, and indirectly connected to the positive and negative terminals through the outer devices. A middle DC lead typically connects indirectly through midpoint clamping devices to terminals located between each pair of inner and outer solid-state switch devices.

Such conventional methods and systems for power conversion have generally been considered satisfactory for their intended purpose. However, there is still a need in the art for improved converters. The present disclosure provides a solution for this need.

SUMMARY OF THE INVENTION

A phase leg for a multilevel inverter includes a first direct current lead, an outer solid-state switch, an inner solid-state switch, and a midpoint-clamping device. The outer solid-state switch device is connected to the first direct current lead. The inner solid-state switch is connected in series with the outer solid-state switch. The midpoint-clamping device is a bi-directional current flow device connected between a second direct current (DC) lead and a node between the inner and outer solid-state switches for reducing conduction losses associated with current flowing through the phase leg.

In certain embodiments the inner solid-state switch can be a first inner solid-state switch and the phase leg can include a second inner solid-state switch connected in series with the first inner solid-state switch. The outer solid-state switch can be a first outer solid-state switch and the phase leg can include a second outer solid-state switch connected in series with the second inner solid-state switch. The second outer solid-state switch device can be connected to the third DC lead. The inner and outer switches can each be field effect transistor (MOSFET) devices or insulated gate bipolar transistor (IGBT) devices.

In accordance with certain embodiments the midpoint-clamping device can be a first midpoint-clamping device and the phase leg can further include a second midpoint-clamping device. The second midpoint-clamping device can be connected to second inner solid-state switch and can be a bi-directional current flow midpoint-clamping device. Either or both of the midpoint-clamping devices can be a MOSFET. A diode can be connected in parallel with each midpoint-clamping device.

It is further contemplated that in accordance with certain embodiments the first DC lead can be a positive DC lead, the second DC lead can be a middle DC lead, and the third DC lead can be a negative lead. The middle DC lead can be connected to opposite ends of the first and second inner solid-state switch is through the first and second midpoint-clamping devices. The positive DC lead can be directly connected to the first outer solid-state switch and a negative DC lead can connect to the outer solid-state switch through the inner solid-state switch. It is also contemplated the phase leg can be a three switch state configuration leg having a configuration where the middle DC lead connects to an alternating (AC) lead through both first and second midpoint clamping devices.

A multilevel neutral point inverter is connected between positive, middle and negative DC leads and first, second and third AC phase leads. The multilevel inverter includes first, second and third phase legs. Each phase leg is as described above and is connected to one of the first, second and third AC phase leads, respectively.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
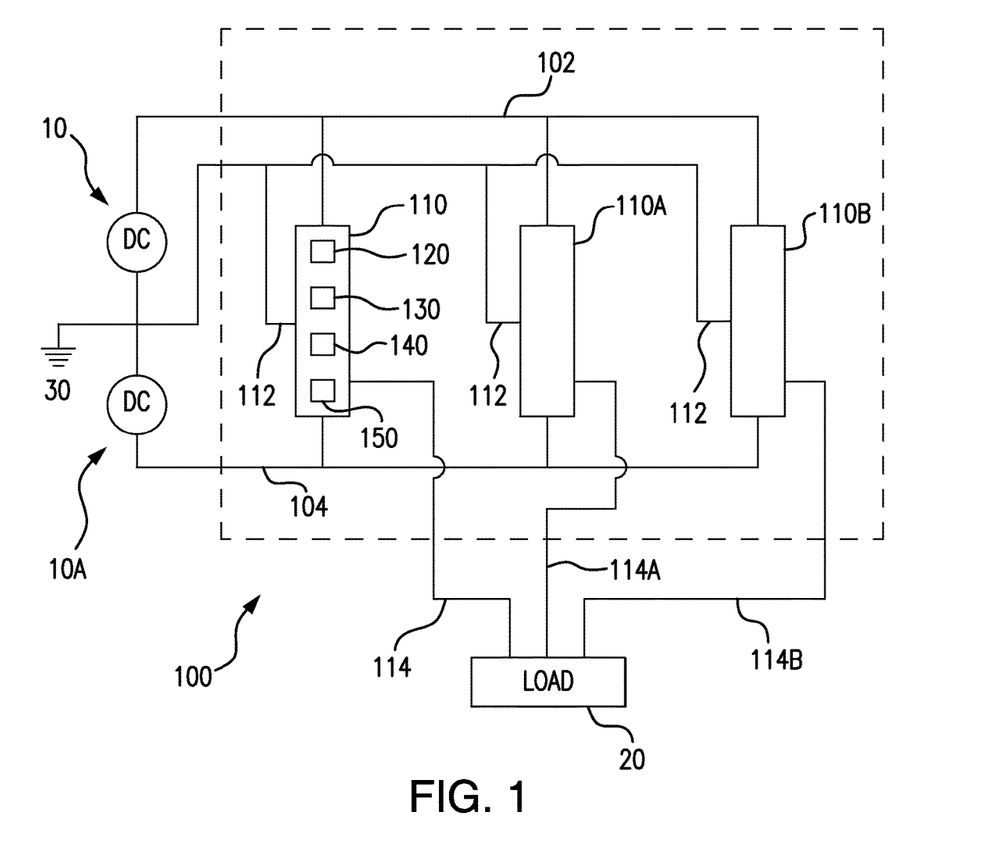
FIG. 1 is schematic diagram of a power converter in accordance with the present disclosure, showing three multilevel phase legs.

Reference will now be made to the drawings wherein like reference numerals identify similar structural features or aspects of the subject disclosure. For purposes of explanation and illustration, and not limitation, a partial view of an exemplary embodiment of the power converter in accordance with the disclosure is shown in FIG. 1 and is designated generally by reference character 100. Other embodiments of power converter phase legs in accordance with the disclosure, or aspects thereof, are provided in FIGS. 2-5, as will be described. The systems and methods described herein can be used in aerospace applications such as motor controllers for converting one type of power to another type of power.

With reference to FIG. 1, inverter 100 is shown schematically. Inverter 100 is connected between a first direct current (DC) power source 10, a second DC power source 10A, and an alternating current (AC) load 20. First and second DC power sources 10 and 10A are configured for providing DC voltage to inverter 100. AC load 20 is a electrical device requiring AC voltage. Inverter 100 is a multilevel inverter configured for converting three-lead DC voltage into AC voltage. As illustrated, inverter 100 is a three-level inverter including a first phase leg 110, a second phase leg 110A and a third phase leg 110B each separately connected to three-phase, wye-connected AC load 20.

First phase leg 110, second phase leg 110A and third phase leg 110B are connected in parallel to first DC power source 10 and second DC power source 10A by a positive DC lead 102, a middle DC lead 112, and a negative DC lead 104. Positive DC lead 102 connects to a positive terminal of first DC power source 10. Middle DC lead 112 connects to a negative terminal of first DC power source 10 and a positive terminal of second DC power source 10A. Negative DC lead 104 connects to a negative terminal of second DC power source 10A. In the illustrated embodiment, middle DC lead 112 is connected to a ground terminal 30. As will be appreciated by those skilled in the art, middle DC lead 112 can be floating or can have fixed impedance in relation to ground without inhibiting functionality of the circuit. A first AC output lead 114 connects first phase leg 110 of inverter 100 to a first terminal of AC load 20. A second AC output lead 114A connects second phase leg 110A to a second terminal of AC load 20. A third AC output lead 114B connects third phase leg 110B to a third terminal of AC load 20.

Figure 3:
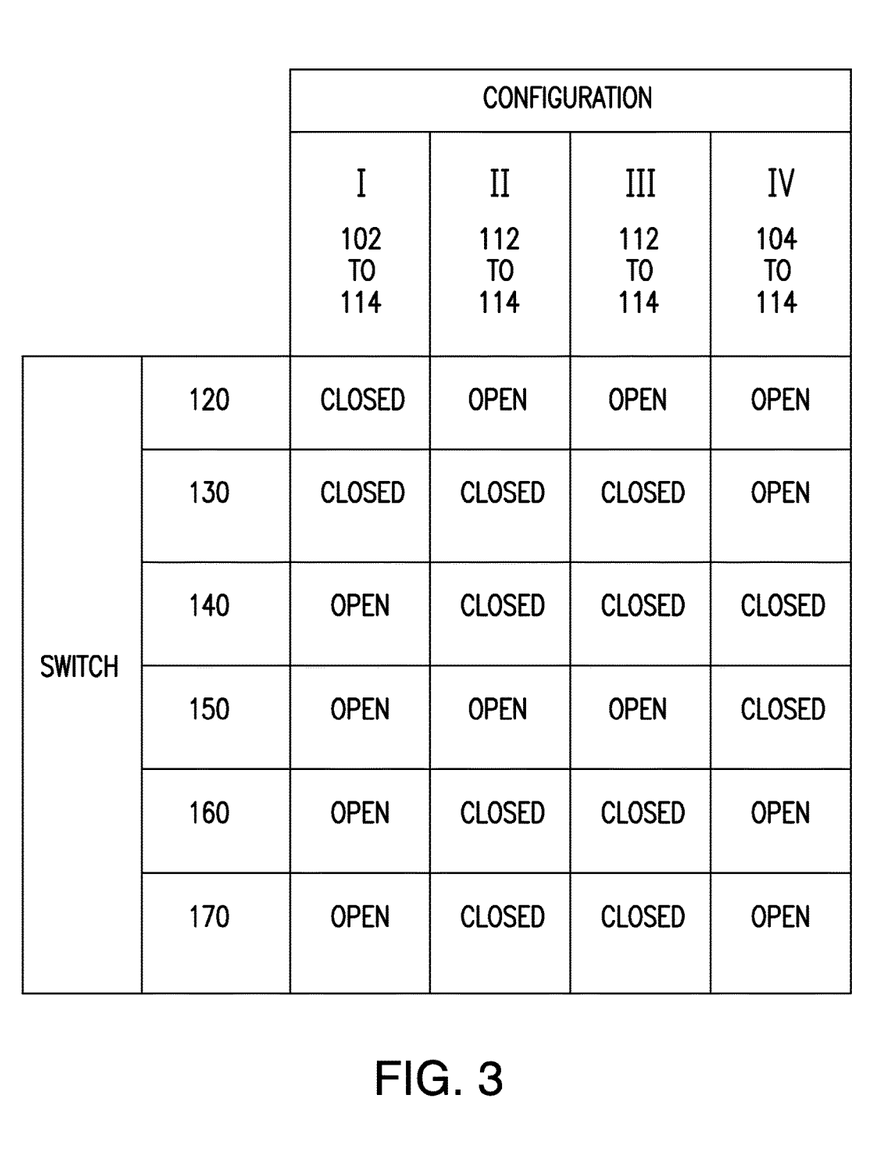
FIG. 3 is a switch state diagram of the multilevel phase leg of FIG. 2, showing switch on and off states in four switch configurations.

Inverter 100 is a solid-state switch inverter with a plurality of switch state configurations wherein a switches (shown schematically as a first outer switch 120, a first inner switch 130, a second inner switch 140, and a second outer switch in FIG. 1) within first phase leg 110, second phase leg 110A, and third phase leg 110B assume different combination of switch states (shown in FIG. 3). This allows for connecting each of first AC phase lead 114, second AC output lead 114A and third AC output lead 114B to one of positive DC lead 102, negative DC lead 104, and middle DC lead 112 so that input DC voltage can be converted AC voltage by varying output voltage in a stepwise manner, e.g. approximating a sinusoidal AC voltage waveform.

Figure 2:
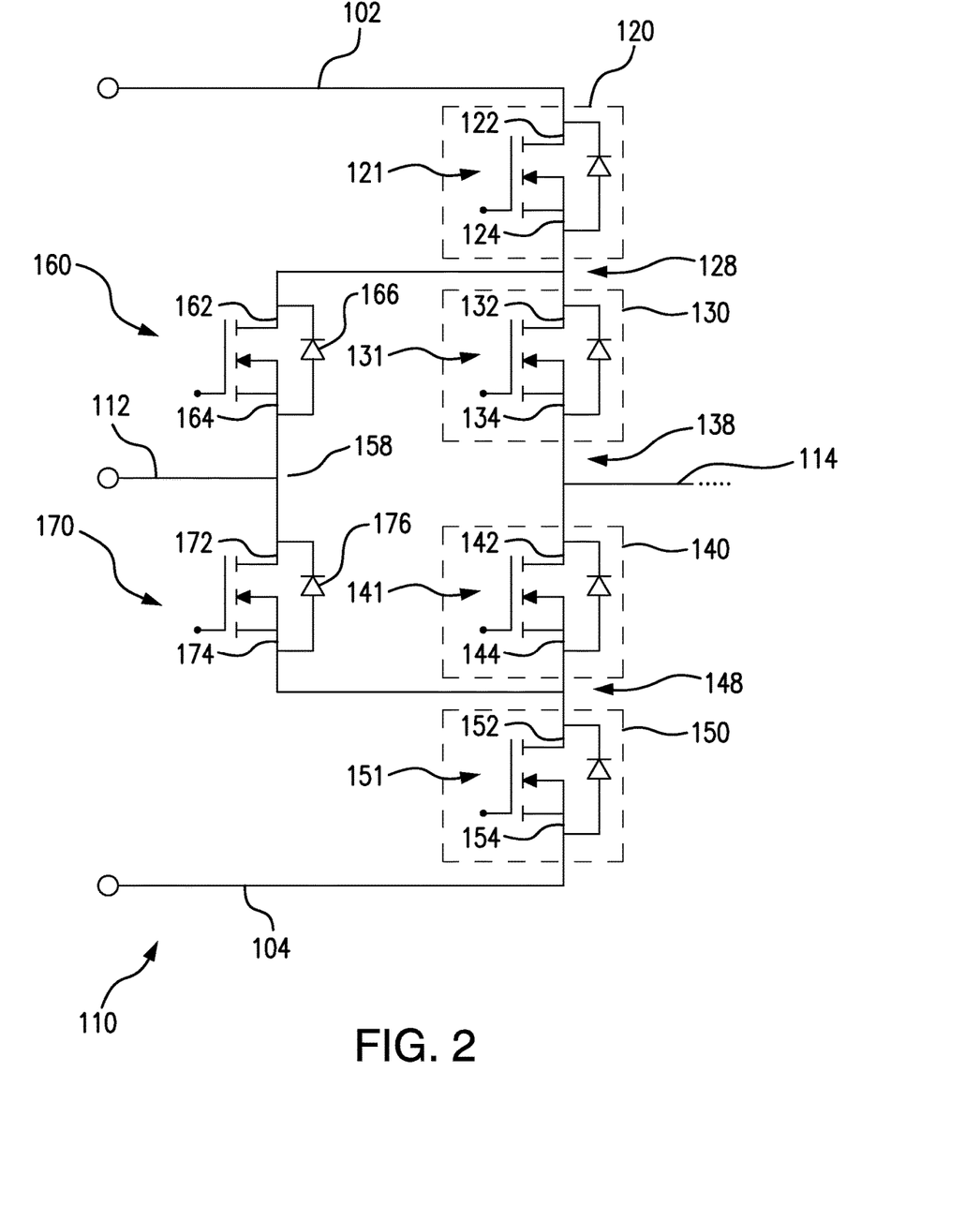
FIG. 2 is a circuit diagram of the multilevel phase leg of FIG. 1, showing midpoint-clamping MOSFETs connected in parallel with inner solid-state switch devices.

With reference to FIG. 2, first phase leg 110 is shown. First phase leg 110 includes a positive DC lead 102, a middle DC lead 112, and negative DC lead 104. A first outer switch 120 connect to positive DC lead 102 and a second outer solid-state switch 150 connects to negative DC lead 104. A first inner switch 130 connects to first outer switch 120 at a first node 128. A second inner switch 140 connects between first inner switch 130 and second outer solid-state switch 150 at a second node 138 and a third node 148, the inner and outer solid-state switches being connected in series between positive DC lead 102 and negative DC lead 104. First AC phase lead 114 connects between first and second inner switches 130 and 140.

First phase leg 110 further includes a middle DC lead 112, a first midpoint-clamping device 160 and a second midpoint clamping device 170. First midpoint-clamping device 160 is connected in series with second midpoint-clamping device 170 at a fourth node 158. On respective opposite ends, first and second midpoint-clamping devices 160 and 170 connect with first and second nodes 128 and 138, thereby being arranged in parallel with first and second inner switches 130 and 140. Middle DC lead 112 connects to fourth node 158 between first and second midpoint-clamping devices 160 and 170.

As illustrated, each of the inner and outer solid-state switches includes field effect transistor (MOSFET) devices having sources and drains. Drain 122 connects a first outer MOSFET 121 to positive DC lead 102. Source 124 of first outer MOSFET 121 connects to drain 132 of a first inner MOSFET 131 at first node 128. Source 134 of first inner MOSFET 131 connects to drain 142 of a second inner MOSFET 141 at second node 138. Source 144 of second inner MOSFET 141 connects to drain 152 of a second outer MOSFET 151 at third node 148. Source 154 of second outer MOSFET 151 connects to negative DC lead 104. It is to be understood that in certain embodiments each of the inner and outer solid-state switches are insulated gate bipolar transistor (IGBT) devices having collectors and emitters corresponding to the illustrated MOSFET drains and sources, respectively.

At least one of the first and second midpoint-clamping devices 160 and 170 are bidirectional current flow devices. As illustrated, both first midpoint-clamping device 160 and second midpoint clamping device 170 are bidirectional current flow MOSFET devices with drains and sources. The drain 162 of first midpoint-clamping device 160 is connected to first node 128 between first outer MOSFET 121 and first inner MOSFET 131. The source 164 of first midpoint-clamping device 160 is connected to middle DC lead 112 at fourth node 158. A first midpoint-clamping device diode 166 is connected in parallel with first midpoint-clamping device 160 across drain 162 and source 164 for opposing current flow from first node 128 toward fourth node 158. The drain 172 of second midpoint-clamping device 170 is connected to middle DC lead 112 at fourth node 158. The source 174 of second midpoint-clamping device 170 is connected to third node 148. A second midpoint-clamping device diode 176 is connected in parallel with second midpoint-clamping device 170 across drain 172 and source 174 for opposing current flow from fourth node 158 towards third node 148.

With reference to FIG. 3, a switch configuration table for first phase leg 110 is shown. First phase leg 110 has a first switch configuration I, a second switch configuration II, a third switch configuration III, and a fourth switch configuration IV. Each switch configuration is characterized by which of the phase leg switches are in an on-state and which are in an off-state, thereby defining a different conductive path through the switch to apply a different voltage to the AC lead. In each switch configuration given switches are in on and off states. During power conversion configuration of the switches is changed from one configuration to another configuration to synthesize the output AC waveform by changing the voltage potential connected to first AC phase lead 114 (shown in FIG. 2).

Figure 5A:
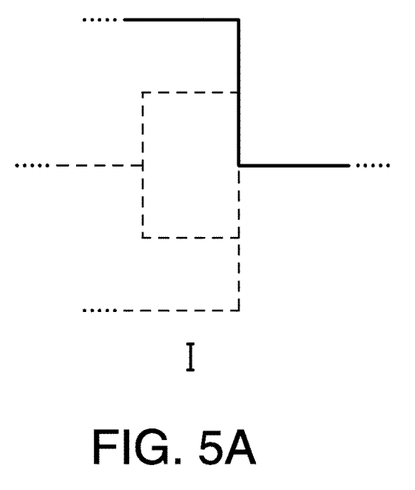
FIGS. 5A-5D are phase leg current flow diagrams for the phase leg of FIG. 2 in accordance with the present disclosure, showing current flow in four phase leg configurations.

In first switch configuration I, first outer MOSFET 121 and first inner MOSFET 131 are in an on-state (i.e. electrically closed) while second inner MOSFET 141, second outer MOSFET 141, first midpoint-clamping device 160, and second midpoint-clamping device 170 are in an off state (i.e. electrically open). This provides connectivity between positive DC lead 102 and first AC phase lead 114 as illustrated in FIG. 5A through the closed switches.

Figure 4A:
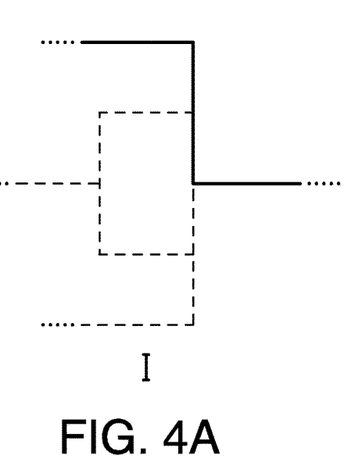
FIGS. 4A-4D are phase leg current flow diagrams for a conventional phase leg, showing current flow in four phase leg configurations.
Figure 4B:
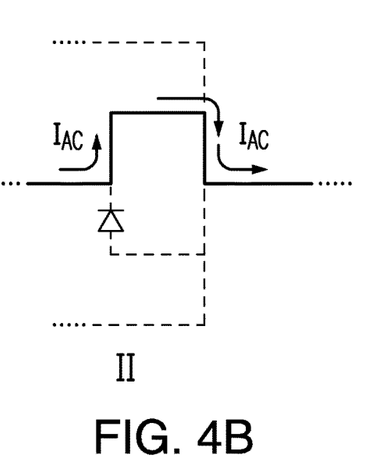
Figure 4C:
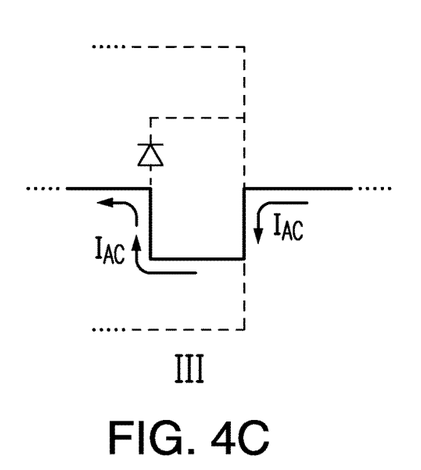
Figure 4D:
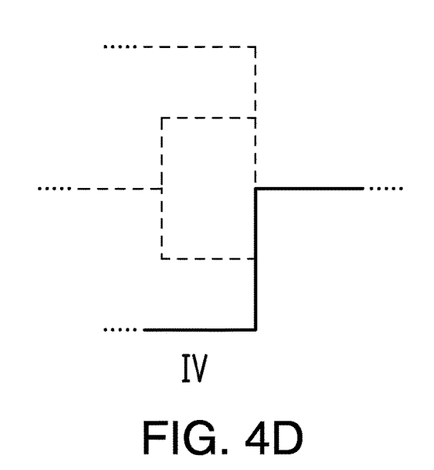
Figure 5B:
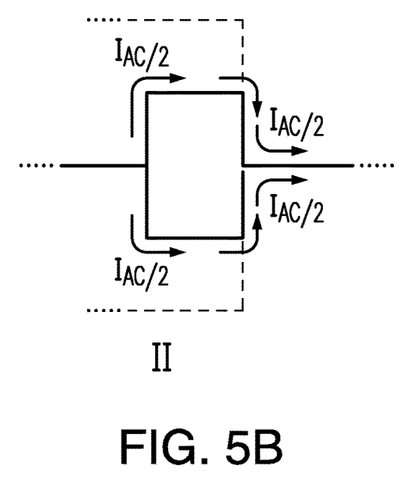
Figure 5C:
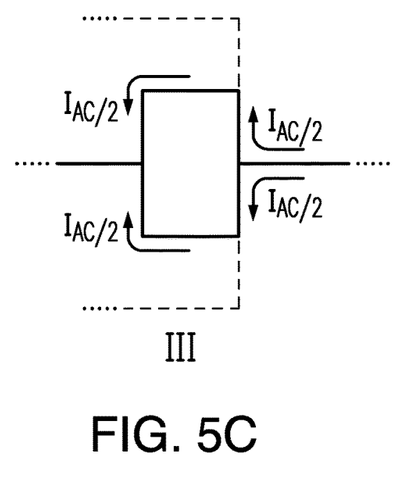
Figure 5D:
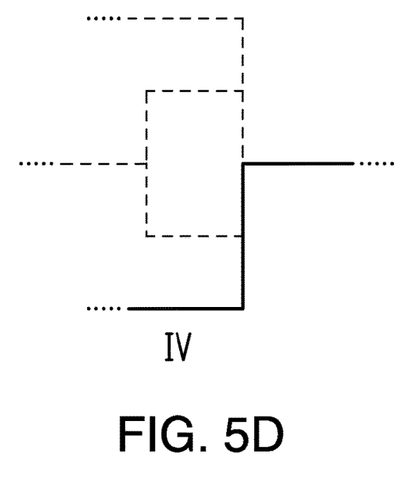

In second and third switch configurations II and III, first inner MOSFET 131, second inner MOSFET 141, first midpoint-clamping device 160, and second midpoint-clamping device 170 are in on-states while first outer MOSFET 121 and second outer MOSFET 151 are in off-states. This provides connectivity between middle DC lead 112 and first AC phase lead 114 as illustrated in FIG. 5B and FIG. 5C. Notably, current flows through two pathways between middle DC lead 112 and first AC phase lead 114. This divides the current flow between the two legs, reducing conduction losses. In conventional phase legs, current typically follows a single path between the middle DC lead and the AC lead (as illustrated in FIG. 4B and FIG. 4C).

Conventional three-level neutral point clamped inverters typically utilize diodes to conduct current to the middle DC lead when switched to the middle DC lead. Since diodes conduct current in only one direction, conventional phase legs typically connect the middle DC lead to the AC lead through only one of the two parallel paths extending between the middle DC lead and the AC lead. While satisfactory for its intended purpose, this induces greater conduction losses when the phase leg is in the midpoint AC lead voltage state than when both parallel paths are used for current flow such as in the switch configurations shown in FIG. 4B and FIG. 4C.

In embodiments, bi-directional current flow devices such as MOSFETs are employed on the parallel legs in place of conventional midpoint clamping diodes. They are controlled with the same PWM waveforms used in conventional inverters for controlling switch state configurations and employ MOSFET body diodes to conduct current during dead time intervals. Once the dead time interval has tolled and the inverter is commanded to electrically connect the middle DC lead to the AC lead (i.e. the midpoint clamping state), two parallel conduction paths are formed by the MOSFETs. This can reduce or eliminate forward voltage drop across midpoint clamping diodes in conventional inverter phase legs, thereby conducting current between the middle DC lead and the AC with lower conduction losses than phase legs employing midpoint clamping diodes. This can provide greater efficiency than conventional inverter phase legs.

Power loss in conventional inverter phase legs, such as illustrated in FIGS. 4A-4D, can be characterized by Equation 1 when the middle DC lead is connected to the AC lead:

$$\text{Power Loss} = (I_{AC} * V_f) + (I_{AC})^2 * (R_{eq} + R_{DS\ ON})$$ Equation 1:

Wherein:
$I_{AC}$ is current flow out of the AC output lead;
$V_f$ is forward voltage drop across the midpoint clamping diode;
$R_{eq}$ is the equivalent resistance of the midpoint clamping diodes; and
$R_{DS\ ON}$ is the on-state drain to source resistance of the inner MOSFETs.

In embodiments of phase legs described herein having bidirectional voltage clamping devices, such as illustrated in FIGS. 5A-5D, power loss is governed by Equation 2.

$$\text{Power Loss} = (I_{AC})^2 * (R_{DS\ ON})$$ Equation 2:

Wherein:
$I_{AC}$ is current flow out the AC output lead; and
$R_{DS\ ON}$ is the on-state drain to source resistance of the inner MOSFETs and the midpoint clamping MOSFETs This provides for reduced power loss for a given current flow and voltage. In certain embodiments, losses can be reduced by about 50% at high load currents where the diode and transistor voltage drops are about equal. At low current loads the conduction losses will be further reduced in relation to conventional inverter phase legs due to the voltage knee characteristic of diode conduction.

The methods and systems of the present disclosure, as described above and shown in the drawings, provide for power converters with superior properties including reduced conduction losses. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A phase leg for a multilevel inverter, comprising:
a first DC lead;
an outer solid-state switch connected to the first DC lead;
an inner solid-state switch connected in series with the outer solid-state switch; and
a midpoint-clamping device connected between a second DC lead and a node between the inner and outer solid-state switches, wherein the midpoint-clamping device is a bi-directional current flow device for reducing conduction losses associated with current flowing through the device,
wherein the inner solid-state switch is a first inner solid-state switch, and further including a second inner solid-state switch connected in series with the first inner solid-state switch,
wherein the outer solid-state switch is a first outer solid-state switch, and further including a second outer solid-state switch connected in series with the second inner solid-state switch,
wherein the midpoint-clamping device is a first midpoint-clamping device and further including a second midpoint-clamping device connected between the second DC lead and a node arranged between the second inner and second outer solid-state switches,
wherein the second midpoint-clamping device is a bi-directional current flow device for reducing conduction losses associated with current flowing through the device.

2. The phase leg as recited in claim 1, wherein the midpoint-clamping device is a MOSFET.

3. The phase leg as recited in claim 1, further including a diode connected in parallel with the midpoint-clamping device.

4. The phase leg as recited in claim 1, wherein the inner and outer solid-state switches are MOSFET devices.

5. The phase leg as recited in claim 1, wherein the inner and outer solid-state switches are IGBT devices.

6. The phase leg as recited in claim 1, wherein the inner solid-state switch is a first inner solid-state switch, and further including a second inner solid-state switch connected in series with the first inner solid-state switch.

7. The phase leg as recited in claim 6, wherein the outer solid-state switch is a first outer solid-state switch, and further including a second outer solid-state switch connected in series with the second inner solid-state switch.

8. The phase leg as recited in claim 1, wherein the second DC lead is a middle DC lead connected to opposite ends of the first and second inner solid-state switch through the first and second midpoint-clamping devices.

9. The phase leg as recited in claim 1, wherein the first DC lead is a positive DC lead directly connected to the outer solid-state switch, and further including a negative DC lead connected to the outer solid-state switch through the inner solid-state switch.

10. A phase leg for a multilevel inverter, comprising:
a first DC lead;
an outer solid-state switch connected to the first DC lead;

an inner solid-state switch connected in series with the outer solid-state switch;

a first midpoint-clamping device connected between a second DC lead and a node between the inner and outer solid-state switches; and a second midpoint-clamping device connected between the second DC lead and inner solid-state switch, wherein the first and second midpoint-clamping device are bi-directional current flow device for reducing conduction losses associated with current flowing through the device, wherein the first DC lead is a positive DC lead directly connected to the outer solid-state switch, and further including a negative DC lead connected to the outer solid-state switch through the inner solid-state switch, wherein the phase leg is a three-state phase leg having a first state connecting the positive DC lead to an AC lead, a second state connecting the negative DC lead to the AC lead, and a third state connecting the middle DC lead to the AC lead through both the first and second midpoint-clamping devices.

11. A multilevel neutral point clamped inverter, comprising:

a positive DC lead, a middle DC lead, and a negative DC lead;

a first AC lead, a second AC lead, and a third AC lead; and a first phase leg coupled between the DC leads and the first AC lead, a second phase leg coupled between the DC leads and the second AC lead, and a third phase leg connected between the DC leads and the third AC lead, wherein each phase leg includes:

a first outer solid-state switch connected to the positive DC lead;

a first inner solid-state switch connected in series with the first outer solid-state switch and one of the first, second, and third AC leads;

a second inner solid-state switch connected in series with the first inner solid-state switch;

a second outer solid-state switch connected in series with the second inner solid-state device and to the negative DC lead;

a first bi-directional current flow midpoint-clamping device connected between the middle DC lead and between the first outer and first inner solid-state switch devices; and a second bi-directional current flow midpoint-clamping device connected between the middle DC lead and between the first outer and first inner solid-state switch devices, wherein the phase leg is a three-state phase leg having a first state connecting the positive DC lead to the AC lead, a second state connecting the negative DC lead to the AC lead, and a third state connecting the middle DC lead through both the midpoint-clamping devices to the AC lead.

12. The inverter as recited in claim 11, wherein each of the first, second, third and fourth solid-state switch devices are IGBT devices.

13. The inverter as recited in claim 11, wherein the first and second reverse current flow midpoint-clamping devices are MOSFET devices.

* * * * *